US012789556B2

(12) United States Patent
Tomomatsu

(10) Patent No.: US 12,789,556 B2
(45) Date of Patent: Nov. 10, 2026

(54) PNEUMATIC TIRE

(71) Applicant: The Yokohama Rubber Co., LTD., Tokyo (JP)

(72) Inventor: Ryoichi Tomomatsu, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 1003 days.

(21) Appl. No.: 17/310,341

(22) PCT Filed: Dec. 24, 2019

(86) PCT No.: PCT/JP2019/050722
§ 371 (c)(1),
(2) Date: Jul. 28, 2021

(87) PCT Pub. No.: WO2020/158265
PCT Pub. Date: Aug. 6, 2020

(65) Prior Publication Data

US 2022/0063341 A1 Mar. 3, 2022

(30) Foreign Application Priority Data

Jan. 29, 2019 (JP) ................................ 2019-013565

(51) Int. Cl.
*B60C 11/00* (2006.01)
*B60C 11/03* (2006.01)

(52) U.S. Cl.
CPC ...... *B60C 11/0058* (2013.01); *B60C 11/0302* (2013.01); *B60C 11/0304* (2013.01); *B60C 2011/0025* (2013.01)

(58) Field of Classification Search
CPC ............... B60C 11/005; B60C 11/0058; B60C 2011/0025; B60C 9/2009
See application file for complete search history.

(56) References Cited

U.S. PATENT DOCUMENTS 5,479,977 A * 1/1996 Tamano .................... B60C 9/09 152/554
2004/0211501 A1 10/2004 Kajita
(Continued)

FOREIGN PATENT DOCUMENTS

CN 1521022 A 8/2004
CN 108407552 A * 8/2018 ........... B60C 11/005
(Continued)

OTHER PUBLICATIONS

JP 2012-126300A Machine Translation (Year: 2012).*
(Continued)

*Primary Examiner* — Katelyn W Smith
*Assistant Examiner* — Wendy L Boss
(74) *Attorney, Agent, or Firm* — Thorpe North & Western

(57) ABSTRACT

This pneumatic tire includes a carcass layer, a pair of cross belts disposed on an outer side of the carcass layer in a radial direction, and a tread rubber including a cap tread and an undertread that are layered, the tread rubber being disposed on the outer side of the cross belts in the radial direction. Additionally, the loss tangent tan δ_cap of the cap tread 151 at 60° C. has the relationship $\tan \delta\_ut < \tan \delta\_cap$ with respect to the loss tangent tan δ_ut of the undertread 152 at 60° C. In addition, a maximum gauge UT_ce of the undertread in center land portions has the relationship 1.20≤UT_ce/UT_sh≤2.50 with respect to a maximum gauge UT_sh of the undertread in ground contact regions of shoulder land portions.

16 Claims, 7 Drawing Sheets

(56) References Cited

U.S. PATENT DOCUMENTS

| | | | | |
|---|---|---|---|---|
| 2012/0132332 | A1* | 5/2012 | Zhao | B60C 11/00 152/209.5 |
| 2012/0247632 | A1* | 10/2012 | Hayashi | B60C 11/0306 152/209.22 |
| 2013/0167997 | A1* | 7/2013 | Hayashi | B60C 11/0306 152/209.18 |
| 2015/0083293 | A1 | 3/2015 | Zhao et al. | |
| 2015/0158344 | A1 | 6/2015 | Kishizoe | |
| 2018/0290495 | A1 | 10/2018 | Sato | |
| 2019/0061430 | A1* | 2/2019 | Kamigori | B60C 11/0332 |
| 2021/0221177 | A1* | 7/2021 | Fujii | B60C 11/04 |

FOREIGN PATENT DOCUMENTS

| | | | | |
|---|---|---|---|---|
| EP | 1 440 822 | A1 | 7/2004 | |
| EP | 2676808 | A1 * | 12/2013 | B60C 11/005 |
| JP | 49-67306 | A | 6/1974 | |
| JP | S62-6113 | U | 1/1987 | |
| JP | H06200076 | * | 7/1994 | |
| JP | 9-150605 | A | 6/1997 | |
| JP | 4260240 | B2 | 4/2009 | |
| JP | 2010-208551 | A | 9/2010 | |
| JP | 2012-126300 | A | 7/2012 | |
| JP | 2013-256232 | A | 12/2013 | |
| JP | 2015-227091 | A | 12/2015 | |
| JP | 5902394 | B2 | 4/2016 | |
| WO | 2019/220680 | A1 | 11/2019 | |

OTHER PUBLICATIONS

CN-108407552 machine translation (Year: 2018).*
JP H06200076 machine translation (Year: 1994).*
CN 108407552A human assisted machine translation (Year: 2018).*
Extended European Search Report for application PCT/JP2019/050722, dated Sep. 5, 2022, 8 pages.

* cited by examiner

| | UTce [mm] | UTsh [mm] | UTce/UTsh | UTce/Gace | UTsh/Gash | UTe/Gash | UTg/Gag | (UTg/Gag)/(UTce/Gace) | ROLLING RESISTANCE PERFORMANCE | DURABILITY PERFORMANCE |
|---|---|---|---|---|---|---|---|---|---|---|
| CONVENTIONAL EXAMPLE 1 | 1.0 | 1.0 | 1.00 | 0.13 | 0.13 | 1.00 | 0.10 | 1.00 | 100 | 100 |
| CONVENTIONAL EXAMPLE 2 | 2.5 | 2.5 | 1.00 | 0.31 | 0.31 | 1.00 | 0.10 | 1.00 | 110 | 90 |
| EXAMPLE 1 | 2.5 | 2.0 | 1.25 | 0.31 | 0.25 | 1.00 | 0.10 | 1.00 | 108 | 98 |
| EXAMPLE 2 | 2.5 | 1.5 | 1.67 | 0.31 | 0.19 | 1.00 | 0.10 | 1.00 | 106 | 100 |
| EXAMPLE 3 | 2.5 | 1.0 | 2.50 | 0.31 | 0.13 | 1.00 | 0.10 | 1.00 | 104 | 100 |
| EXAMPLE 4 | 3.0 | 1.7 | 1.80 | 0.38 | 0.21 | 1.00 | 0.10 | 1.00 | 106 | 99 |
| EXAMPLE 5 | 4.0 | 2.2 | 1.80 | 0.50 | 0.28 | 1.00 | 0.10 | 1.00 | 108 | 98 |
| EXAMPLE 6 | 5.0 | 2.8 | 1.80 | 0.63 | 0.35 | 1.00 | 0.10 | 1.00 | 115 | 97 |
| EXAMPLE 7 | 3.0 | 1.7 | 1.80 | 0.38 | 0.21 | 0.15 | 0.10 | 1.00 | 106 | 99 |
| EXAMPLE 8 | 3.0 | 1.7 | 1.80 | 0.38 | 0.21 | 0.25 | 0.10 | 1.00 | 108 | 99 |
| EXAMPLE 9 | 3.0 | 1.7 | 1.80 | 0.38 | 0.21 | 0.15 | 0.30 | 1.00 | 109 | 98 |
| EXAMPLE 10 | 3.0 | 1.7 | 1.80 | 0.38 | 0.21 | 0.15 | 0.55 | 1.00 | 110 | 97 |
| EXAMPLE 11 | 3.0 | 1.7 | 1.80 | 0.38 | 0.21 | 0.15 | 0.30 | 0.20 | 110 | 96 |
| EXAMPLE 12 | 3.0 | 1.7 | 1.80 | 0.38 | 0.21 | 0.15 | 0.30 | 0.35 | 111 | 97 |

FIG. 8

PNEUMATIC TIRE

TECHNICAL FIELD

The technology relates to a pneumatic tire and particularly relates to a pneumatic tire that can reduce tire rolling resistance while maintaining tire durability performance.

BACKGROUND ART

In order to improve tire ground contact characteristics, recent pneumatic tires have a two-layer structure including a cap tread including a tread rubber exposed at a tread surface to form an outer surface of a tread portion and an undertread disposed below the cap tread. The technology described in Japan Patent No, 4260240 is a conventional pneumatic tire that is configured in this manner.

SUMMARY

The technology provides a pneumatic tire that can reduce tire rolling resistance while maintaining tire durability performance.

An embodiment of the present technology provides a pneumatic tire including a carcass layer, a pair of cross belts disposed on an outer side of the carcass layer in a radial direction, a tread rubber including a cap tread and an undertread that are layered, the tread rubber being disposed on the outer side of the cross belts in the radial direction, a pair of shoulder main grooves and at least one center main groove that are formed in the tread surface, and a pair of shoulder land portions and two or more center land portions that are defined by the shoulder main grooves and the center main grooves, a loss tangent tan δ_cap of the cap tread at 60° C. having a relationship tan δ_ut<tan δ_cap with respect to a loss tangent tan δ_ut of the undertread at 60° C., and a maximum gauge UT_ce of the undertread in the center land portion having a relationship 1.20≤UT_ce/UT_sh≤2.50 with respect to a maximum gauge UT_sh of the undertread in a ground contact region of the shoulder land portion.

In the pneumatic tire according to an embodiment of the technology, (1) the undertread in the center land portion has a low loss tangent tan δ_ut and a thick maximum gauge UT_ce, and thus heat build-up in the tread portion center region during rolling of the tire is suppressed, improving tire rolling resistance. Additionally, (2) the undertread of the shoulder land portion has a thin maximum gauge UT_sh, thus relatively ensuring the gauge of the cap tread corresponding to high breakdown resistance. This suppresses cracks and/or fractures in the shoulder land portions caused by the significant effect of repeated strain during rolling of the tire, improving the durability of the tire. This is advantageous in that both tire rolling resistance performance and durability performance are provided in a compatible manner.

BRIEF DESCRIPTION OF DRAWINGS

FIG. 8 is a table showing the results of performance tests of pneumatic tires according to embodiments of the technology.

DETAILED DESCRIPTION

Embodiments of the technology are described in detail below with reference to the drawings. However, the technology is not limited to these embodiments. Moreover, constituents of the embodiments include elements that are substitutable while maintaining consistency with the technology, and obviously substitutable elements. Furthermore, the modified examples described in the embodiments can be combined as desired within the scope apparent to one skilled in the art.

Pneumatic Tire

Figure 1:
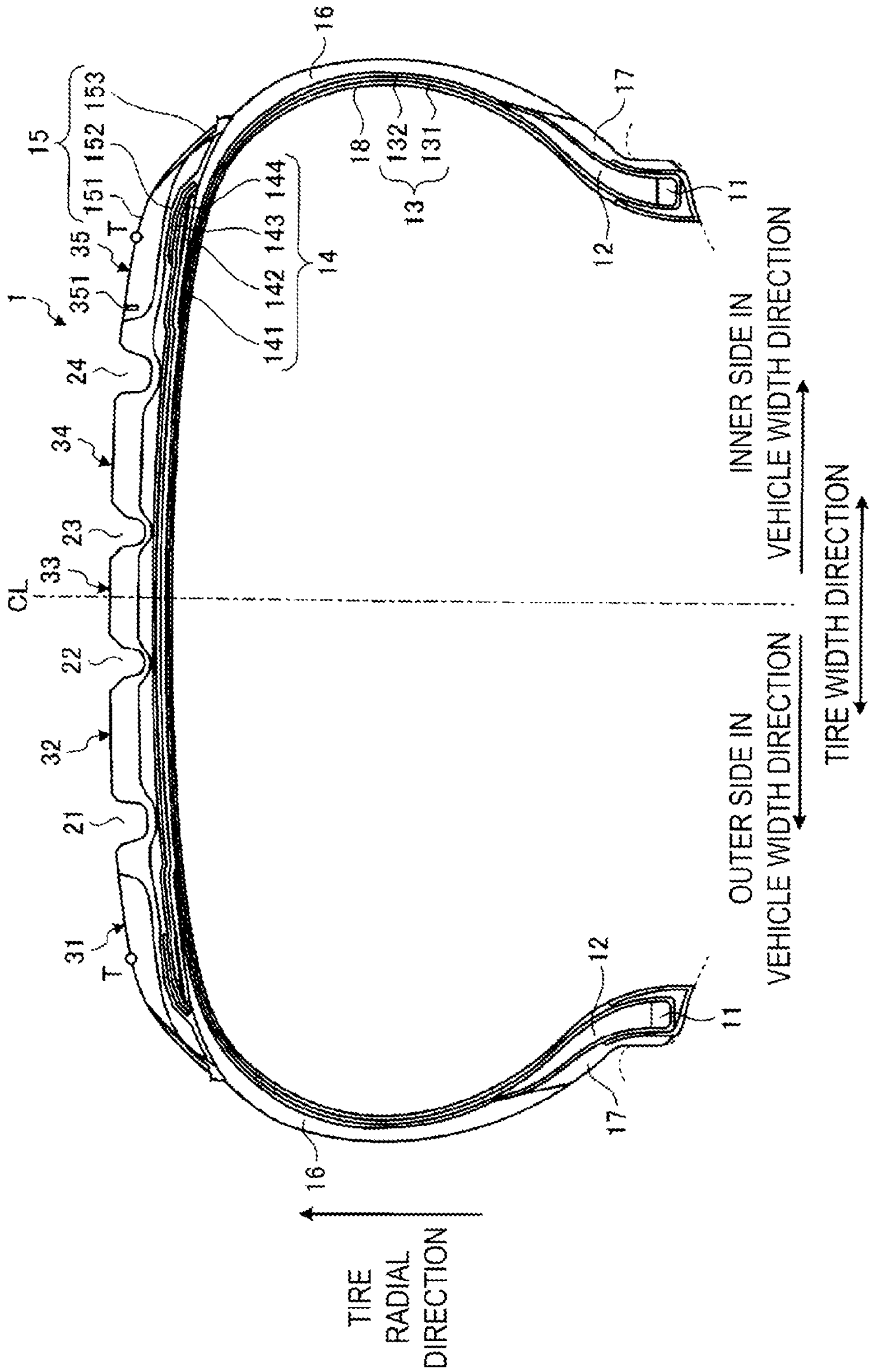
FIG. 1 is a cross-sectional view in a tire meridian direction illustrating a pneumatic tire according to an embodiment of the technology.

FIG. 1 is a cross-sectional view in a tire meridian direction illustrating a pneumatic tire according to an embodiment of the technology. The same drawing illustrates a cross-sectional view of a half region in a tire radial direction. FIG. 1 also illustrates a radial tire for a passenger vehicle as an example of a pneumatic tire.

In the same drawing, the cross-section in the tire meridian direction is defined as a cross-section of the tire taken along a plane that includes a tire rotation axis (not illustrated). Further, a tire equatorial plane CL is defined as a plane perpendicular to the tire rotation axis through a midpoint between measurement points in a tire cross-sectional width defined by JATMA (The Japan Automobile Tyre Manufacturers Association, Inc.). Furthermore, the tire width direction is defined as a direction parallel with the tire rotation axis, and the tire radial direction is defined as a direction perpendicular to the tire rotation axis. In addition, point T denotes a tire ground contact edge.

Furthermore, an inner side in a vehicle width direction and an outer side in the vehicle width direction are defined with respect to the vehicle width direction in a case where the tire is mounted on a vehicle. Additionally, left and right regions demarcated by the tire equatorial plane are defined as an outer region in the vehicle width direction and an inner region in the vehicle width direction. Further, the pneumatic tire includes a mounting direction indicator portion (not illustrated) that indicates the tire mounting direction with respect to a vehicle. The mounting direction indicator portion, for example, is composed of a mark or recesses/protrusions on a sidewall portion of the tire. For example, Economic Commission for Europe Regulation 30 (ECE R30) stipulates that the vehicle mounting direction indicator portion be provided on the sidewall portion on the outer side in the vehicle width direction in a case where the tire is mounted on a vehicle.

A pneumatic tire 1 has an annular structure with the tire rotation axis as its center and includes: a pair of bead cores 11, 11, a pair of bead fillers 12, 12, a carcass layer 13, a belt layer 14, a tread rubber 15, a pair of sidewall rubbers 16, 16, and a pair of rim cushion rubbers 17, 17 (see FIG. 1).

The pair of bead cores 11, 11 includes one or a plurality of bead wires made of steel and wound annularly multiple times and are embedded in bead portions to configure cores of the left and right bead portions. The pair of bead fillers 12, 12 are respectively disposed on an outer circumference of the pair of bead cores 11, 11 in the tire radial direction and reinforce the bead portions.

The carcass layer 13 has a single layer structure made of one carcass ply or a multilayer structure made of a plurality of carcass plies being layered and extends between the left and right bead cores 11, 11 in a toroidal shape, forming the framework of the tire. Additionally, both end portions of the carcass layer 13 are wound and turned back toward an outer side in the tire width direction so as to wrap the bead cores 11 and the bead fillers 12 and fixed. Moreover, the carcass ply of the carcass layer 13 is made by covering a plurality of carcass cords made of steel or an organic fiber material (for example, aramid, nylon, polyester, rayon, or the like) with coating rubber and performing a rolling process on the carcass cords, and has a cord angle (defined as an inclination angle in a longitudinal direction of the carcass cords with respect to a tire circumferential direction) of 80 degrees or more and 100 degrees or less.

For example, in the configuration of FIG. 1, the carcass layer 13 has a single layer structure formed of a single carcass ply, and a turned back portion 132 thereof extends along an outer circumferential surface of a body portion 131 and overlaps the belt layer 14 in the tire width direction. Additionally, a terminating end portion of the turned back portion 132 of the carcass layer 13 is located further on the outer side than the shoulder main grooves 21, 24 described below in the tire width direction.

The belt layer 14 includes a plurality of belt plies 141 to 144 being layered, and is disposed by being wound around the outer circumference of the carcass layer 13. The belt plies 141 to 144 include a pair of cross belts 141, 142, a belt cover 143, and belt edge covers 144.

The pair of cross belts 141, 142 are made by covering a plurality of belt cords made of steel or an organic fiber material with coating rubber and performing a rolling process on the belt cords, and each have a cord angle with an absolute value of 15 degrees or more and 55 degrees or less. Further, the pair of cross belts 141, 142 have cord angles (defined as inclination angles in a longitudinal direction of the belt cords with respect to the tire circumferential direction) of opposite signs relative to each other and are layered such that the longitudinal directions of the belt cords intersect each other (a so-called crossply structure). Furthermore, the pair of cross belts 141, 142 are disposed layered on an outer side in the tire radial direction of the carcass layer 13.

The belt cover 143 and the belt edge covers 144 are made by covering a plurality of belt cover cords made of steel or an organic fiber material with coating rubber, and each have a cord angle with an absolute value of 0 degrees or more and 10 degrees or less. Additionally, for example, a strip material is formed of one or a plurality of belt cover cords covered with coating rubber, and the belt cover 143 and the belt edge covers 144 are made by winding this strip material multiple times and in a spiral-like manner in the tire circumferential direction around outer circumferential surfaces of the cross belts 141, 142. Additionally, the belt cover 143 is disposed so as to completely cover the cross belts 141, 142, and the pair of belt edge covers 144 and 144 are disposed covering the left and right edge portions of the cross belts 141, 142 from the outer side in the tire radial direction.

The tread rubber 15 is disposed on the outer circumference of the carcass layer 13 and the belt layer 14 in the tire radial direction and constitutes a tread portion of the tire. Additionally, the tread rubber 15 includes a cap tread 151, an undertread 152, and left and right wing tips 153, 153. Other details of the tread rubber 15 will be described below.

The pair of sidewall rubbers 16, 16 is disposed on the outer side in the tire width direction of the carcass layer 13 and constitutes left and right sidewall portions. For example, in the configuration of FIG. 1, the end portion of the sidewall rubber 16 on the outer side in the tire radial direction is disposed in the lower layer of the tread rubber 15 and is sandwiched between the belt layer 14 and the carcass layer 13. However, no such limitation is intended, and the end portion of the sidewall rubber 16 on the outer side in the tire radial direction may be disposed on the outer layer of the tread rubber 15 and exposed at a buttress portion (not illustrated).

The pair of rim cushion rubbers 17, 17 extends from an inner side in the tire radial direction of the left and right bead cores 11, 11 and turned back portions of the carcass layer 13 toward the outer side in the tire width direction to constitute rim fitting surfaces of the bead portions.

The innerliner 18 is an air permeation preventing layer disposed on the tire inner surface and covering the carcass layer 13, and suppresses oxidation caused by exposure of the carcass layer 13 and also prevents leaking of the air in the tire. In addition, the innerliner 18 is constituted by, for example, a rubber composition with butyl rubber as a main component, thermoplastic resin, thermoplastic elastomer composition made by blending an elastomer component with a thermoplastic resin, and the like.

Tread Pattern

Figure 2:
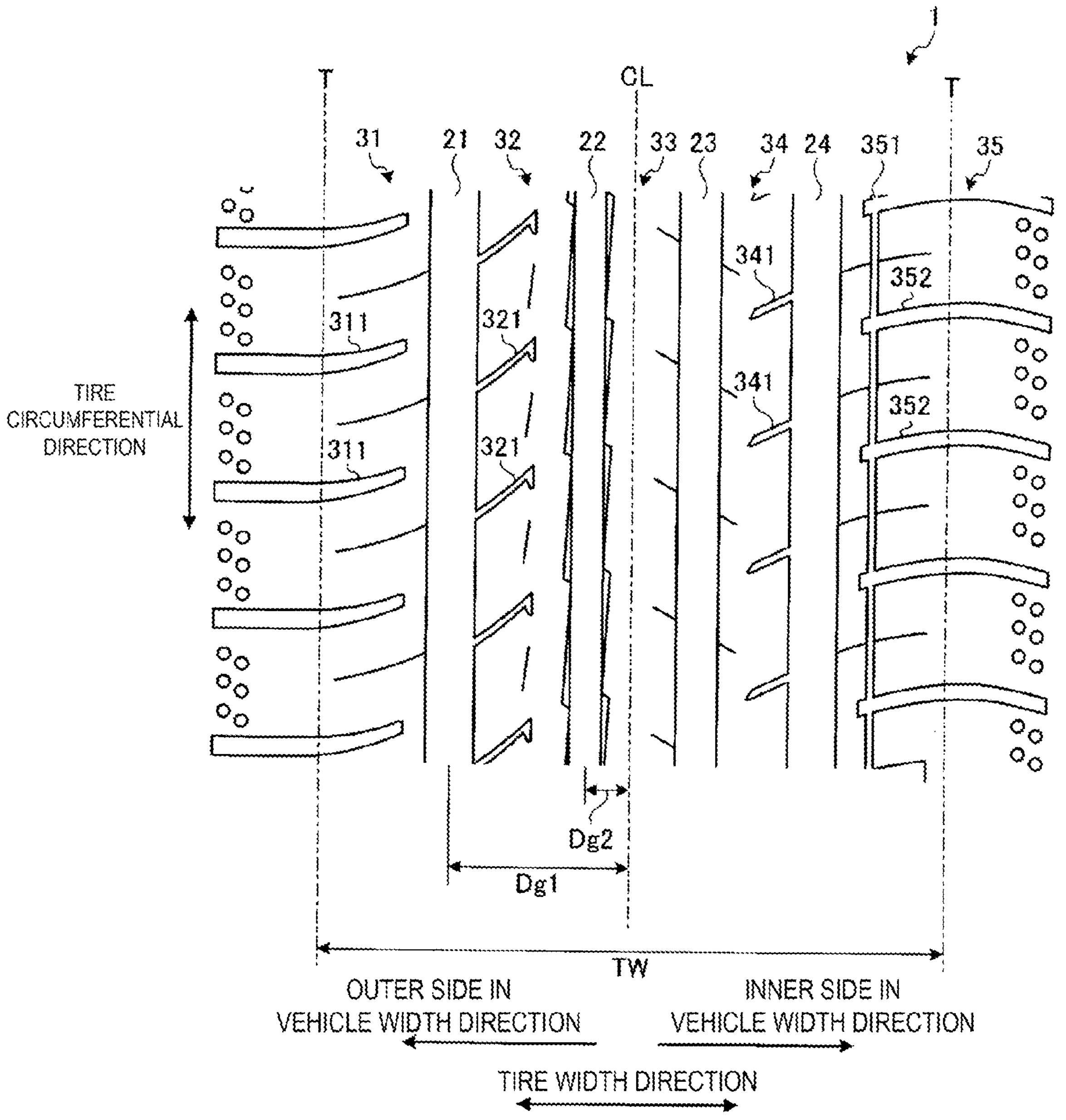
FIG. 2 is a plan view illustrating a tread surface of the pneumatic tire illustrated in FIG. 1.

FIG. 2 is a plan view illustrating a tread surface of the pneumatic tire illustrated in FIG. 1. The same drawing illustrates a tread surface of a summer tire. In reference to the same drawing, "tire circumferential direction" refers to the direction revolving about the tire rotation axis. Reference sign T denotes a tire ground contact edge, and a dimension symbol TW denotes a tire ground contact width.

As illustrated in FIG. 2, the pneumatic tire 1 includes, in a tread surface: a plurality of circumferential main grooves 21 to 24 extending in the tire circumferential direction and a plurality of land portions 31 to 35 defined by the circumferential main grooves 21 to 24.

"Main groove" refers to a groove on which a wear indicator must be provided as specified by JATMA and has a groove width of 4.0 mm or more and a groove depth of 6.5 mm or more.

The groove width is measured as a distance between opposing groove walls at a groove opening portion when the tire is mounted on a specified rim, inflated to a specified internal pressure, and in an unloaded state. In a configuration in which the groove opening portion includes a notch portion or a chamfered portion, the groove width is measured with intersection points between an extension line of the tread contact surface and extension lines of the groove walls as measurement points, in a cross-sectional view parallel with the groove width direction and the groove depth direction.

The groove depth is the distance from the tread contact surface to the maximum groove depth position and is measured when the tire is mounted on a specified rim, inflated to the specified internal pressure, and in an unloaded state. Additionally, in a configuration in which the grooves include a partial recess/protrusion portion or sipes on the groove bottom, the groove depth is measured excluding these portions.

"Specified rim" refers to a "standard rim" defined by JATMA, a "design rim" defined by TRA, or a "measuring rim" defined by ETRTO (The European Tyre and Rim Technical Organisation). Additionally, "specified internal pressure" refers to a "maximum air pressure" defined by JATMA, to the maximum value in "TIRE LOAD LIMITS AT VARIOUS COLD INFLATION PRESSURES" defined by TRA (The Tire and Rim Association, Inc.), or to "INFLATION PRESSURES" defined by ETRTO. Additionally, "specified load" refers to a "maximum load capacity" defined by JATMA, the maximum value in "TIRE LOAD LIMITS AT VARIOUS COLD INFLATION PRESSURES" defined by TRA, or "LOAD CAPACITY" defined by ETRTO. However, in JATMA, in a case of a tire for a passenger vehicle, the specified internal pressure is an air pressure of 180 kPa, and the specified load is 88% of the maximum load capacity at the specified internal pressure.

For example, in the configuration of FIG. 2, the pneumatic tire 1 has a tread pattern that is left-right asymmetric with respect to the tire equatorial plane CL. However, no such limitation is intended, and, for example, the pneumatic tire 1 may have a tread pattern that is left-right axisymmetric with respect to the tire equatorial plane CL and may have a substantially point-symmetric tread pattern having a center point on the tire equatorial plane CL (not illustrated).

Furthermore, in the configuration of FIG. 2, the left and right regions demarcated by the tire equatorial plane CL each have two circumferential main grooves 21, 22; 23, 24. Furthermore, the circumferential grooves 21, 22; 23, 24 are disposed being substantially left-right symmetric with respect to the tire equatorial plane CL as a center. Five land portions 31 to 35 are defined by these circumferential main grooves 21, 22; 23, 24. In addition, one land portion 33 is disposed on the tire equatorial plane CL.

However, no such limitation is intended, and three, or five or more circumferential main grooves may be disposed, or the circumferential main grooves may be arranged asymmetrically with respect to the tire equatorial plane CL (not illustrated). Additionally, one circumferential main groove is disposed on a tire equatorial plane CL (not illustrated).

Additionally, of the circumferential main grooves 21, 22; 23, 24 disposed in one region demarcated by the tire equatorial plane CL, the circumferential main grooves 21, 24 on the outermost side in the tire width direction are defined as shoulder main grooves, and the other circumferential main grooves 22, 23 are defined as center main grooves.

For example, in the configuration of FIG. 2, a distance Dg1 from the tire equatorial plane CL to the groove center line of the shoulder main groove 21 (24) is in the range of 26% or more and 32% or less of a tire ground contact width TW. Additionally, a distance Dg2 from the tire equatorial plane CL to the groove center lines of the center main groove 22 (23) is in the range of 8% or more and 12% or less of the tire ground contact width TW.

The groove center line is defined as an imaginary line connecting the midpoints of the distance between the left and right groove walls. In a case where the groove center line of the main groove has a zigzag shape or a wave-like shape, a distance to the groove center line is defined using, as a measurement point, a straight line parallel to the tire circumferential direction extending through midpoints of the maximum amplitude positions on the left and right of the groove center line.

The tire ground contact width TW is measured as the maximum linear distance in the tire axial direction of a contact surface between the tire and a flat plate when the tire is mounted on a specified rim, inflated to a specified internal pressure, placed perpendicular to the flat plate in a static state, and loaded with a load corresponding to a specified load.

The tire ground contact edge T is defined as a maximum width position in the tire axial direction of the contact surface between the tire and a flat plate when the tire is mounted on a specified rim, inflated to a specified internal pressure, placed perpendicular to the flat plate in a static state, and loaded with a load corresponding to a specified load.

The land portions 31, 35 located on the outer side in the tire width direction and defined in the shoulder main grooves 21, 24 are defined as shoulder land portions. Each of the shoulder land portions 31 and 35 is a land portion on the outermost side in the tire width direction, and is located on the tire ground contact edge T. The other land portions 32 to 34 are defined as center land portions. Note that, in a configuration including four circumferential main grooves 21 to 24 as illustrated in FIG. 2, a pair of shoulder land portions 31, 35 and three center land portions 32 to 34 are defined.

Tread Rubber

Figure 3:
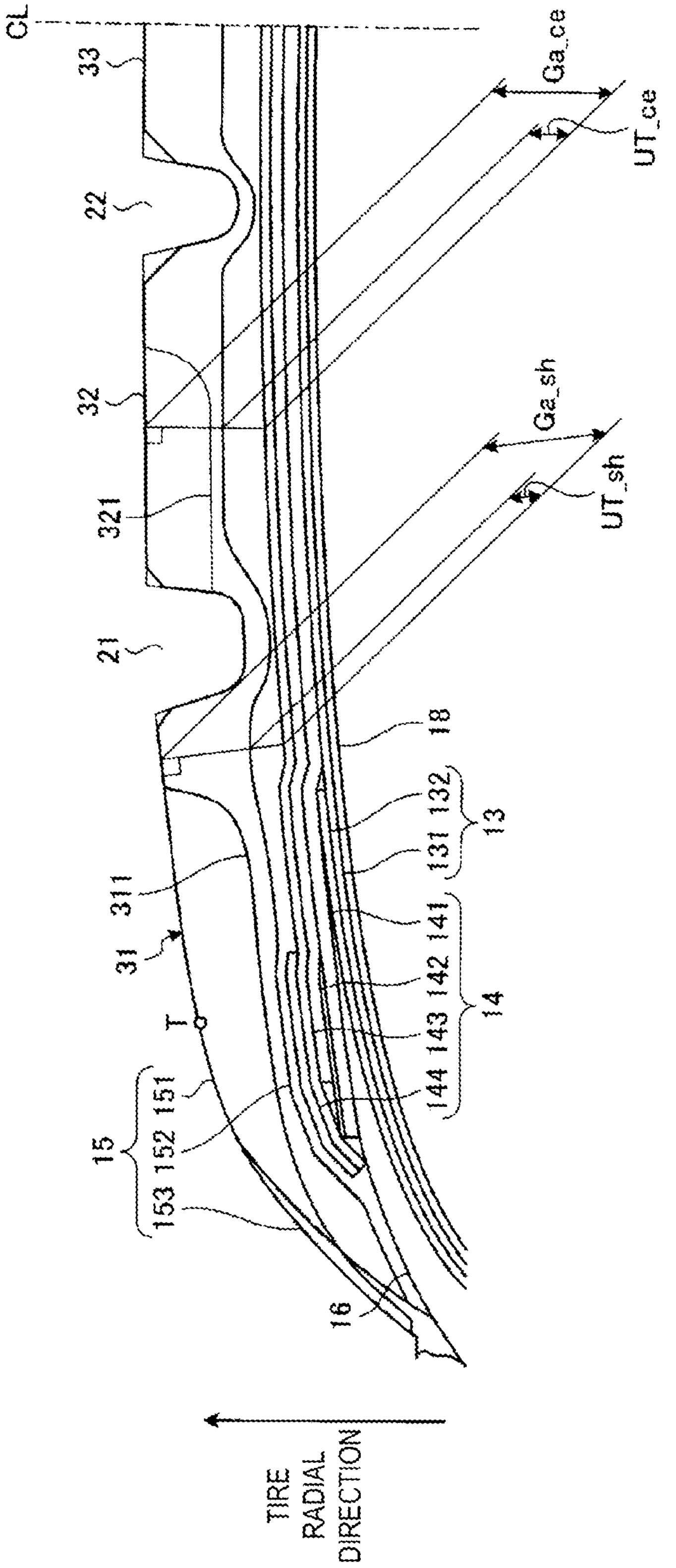
FIG. 3 is a cross-sectional view illustrating a tread portion of the pneumatic tire illustrated in FIG. 1.
Figure 4:
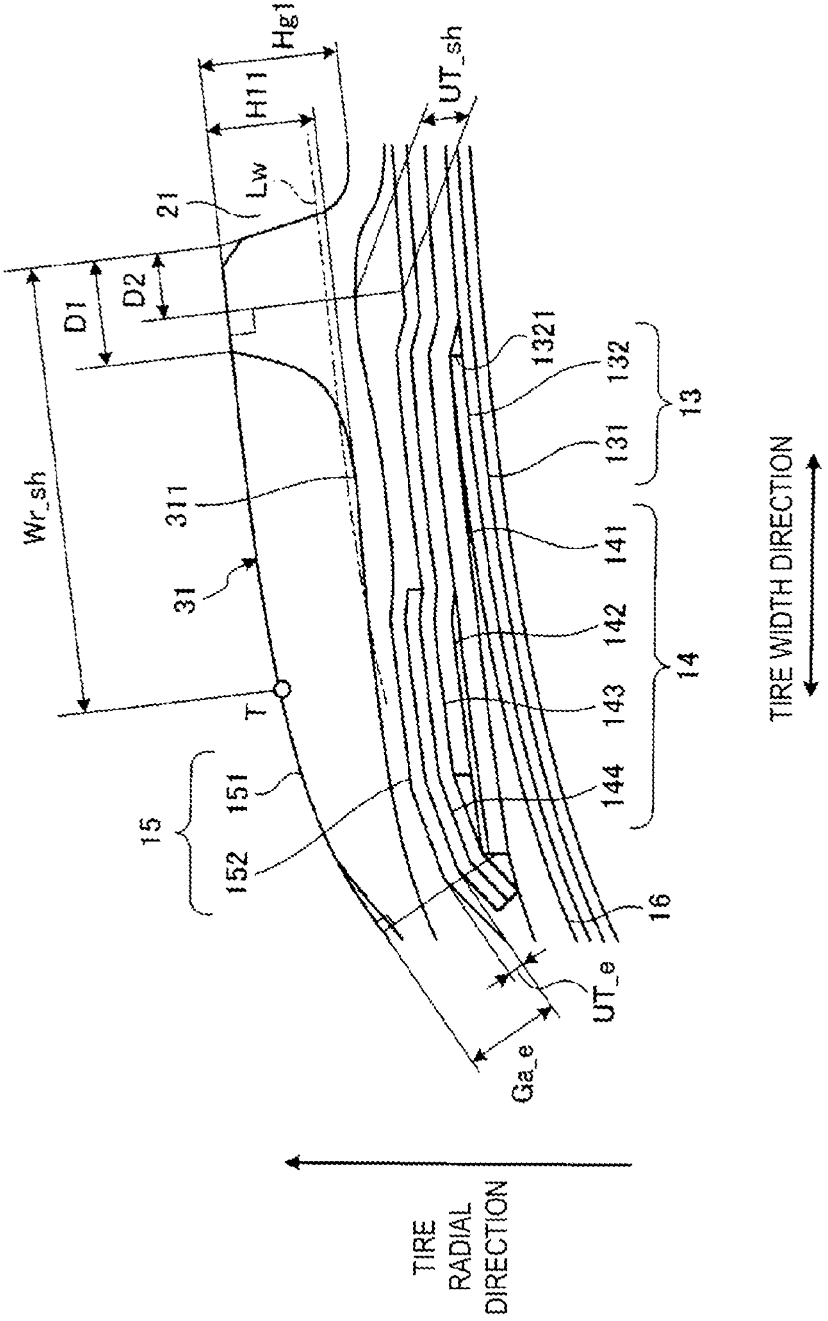
FIG. 4 is an enlarged view illustrating a shoulder land portion of the tread portion illustrated in FIG. 3.
Figure 5:
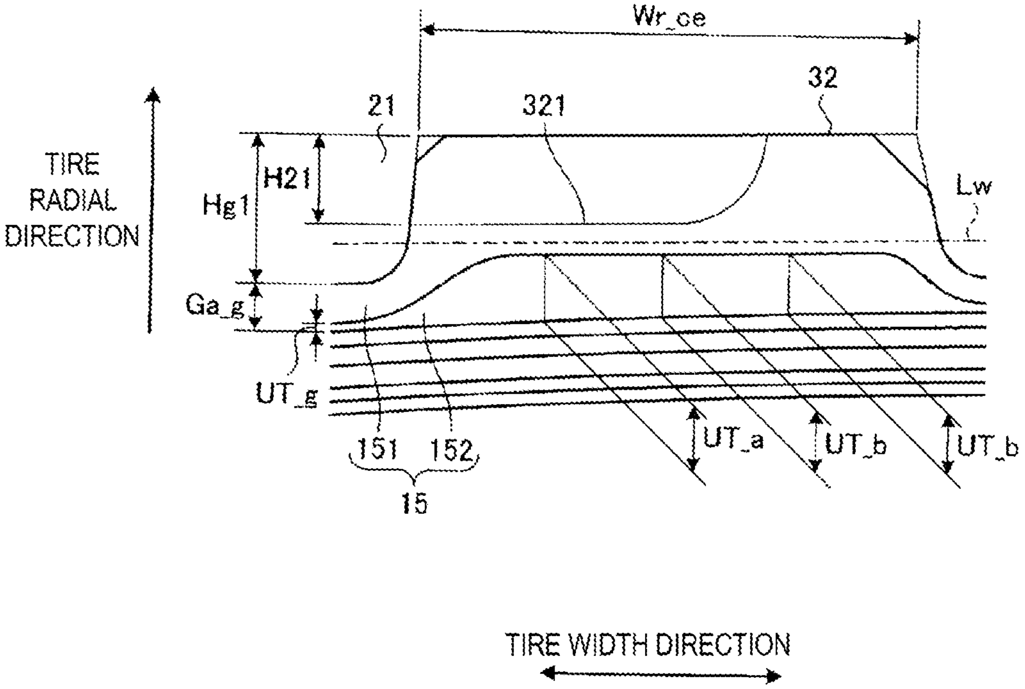
FIG. 5 is an enlarged view illustrating a center land portion of the tread portion illustrated in FIG. 3.

FIG. 3 is a cross-sectional view illustrating the tread portion of the pneumatic tire illustrated in FIG. 1. The same drawing illustrates the half region demarcated by the tire equatorial plane CL. FIG. 4 is an enlarged view illustrating the shoulder land portion of the tread portion illustrated in FIG. 3. FIG. 5 is an enlarged view illustrating the center land portion of the tread portion illustrated in FIG. 3. Note that FIGS. 4 and 5 respectively illustrate cross-sectional views of the shoulder land portion 31 and the center land portion 32 in the outer region in the vehicle width direction. On the other hand, the cross-sectional structure of the tread portion in the outer region in the vehicle width direction is left-right symmetrical with respect to the cross-sectional structure of the inner region in the vehicle width direction except for the configuration of the grooves, notch portions, and sipes in the tread pattern (see FIG. 2).

In the configuration in FIG. 1, the tread rubber 15 includes the cap tread 151, the undertread 152, and the left and right wing tips 153, 153 as described above.

The cap tread 151 is formed of a rubber material that is excellent in ground contact characteristics and weather resistance, and is exposed at the tread surface all across the tire ground contact surface to form an outer surface of the tread portion. In addition, the loss tangent $\tan\delta_{cap}$ of the cap tread 151 is in the range of 0.10 or more and 0.30 or less. Additionally, the rubber hardness $Hs_{cap}$ of the cap tread 151 is in the range of 55 or more and 70 or less.

The loss tangent $\tan\delta$ is measured using a viscoelastic spectrometer available from Toyo Seiki Seisaku-sho Ltd. at a temperature of 60° C., a shear strain of 10%, an amplitude of ±0.5%, and a frequency of 20 Hz.

Rubber hardness is measured in accordance with JIS (Japanese Industrial Standard) K 6253.

The undertread 152 is formed of a rubber material having a lower hardness than the cap tread 151 and being excellent in heat resistance, and is sandwiched between the cap tread 151 and the belt layer 14 to constitute the base portion of the tread rubber 15. Additionally, the loss tangent $\tan\delta_{ut}$ of the undertread is less than 0.10.

Additionally, the loss tangent $\tan\delta_{ut}$ of the undertread is preferably smaller than the loss tangent $\tan\delta_{cap}$ of the cap tread 151 ($\tan\delta_{ut}<\tan\delta_{cap}$). Specifically, the difference between the loss tangent $\tan\delta_{cap}$ of the cap tread 151 and the loss tangent $\tan\delta_{ut}$ of the undertread is preferably 0.02 or more.

Additionally, the rubber hardness $Hs_{ut}$ of the undertread is preferably in the range of 50 or more and 65 or less. Additionally, the rubber hardness $Hs_{ut}$ of the undertread is preferably smaller than the rubber hardness Hs_cap of the cap tread 151 (Hs_ut<Hs_cap). Additionally, a difference between the rubber hardness Hs_cap of the cap tread 151 and the Hs_ut of the undertread is preferably 4 or more.

The wing tip 153 is disposed on each of the left and right ends of the cap tread 151 in the tire width direction to form a buttress portion of the tire.

Additionally, it should be noted that in FIG. 3, the shoulder land portion 31 and the center land portion 32 are located adjacent to each other as a set with the shoulder main groove 21 sandwiched therebetween. At this time, the maximum gauge UT_ce of the undertread 152 in the center land portion 32 preferably has the relationship 1.20≤UT_ce/UT_sh≤2.50 and more preferably has the relationship 0.10≤UT_ce/UT_sh≤0.40, with respect to the maximum gauge UT_sh of the undertread 152 in the ground contact region of the shoulder land portion 31. Accordingly, the gauge of the undertread 152 is set being relatively thick in the center land portion 32 and relatively thin in the shoulder land portion 31.

The rubber gauge in the tread portion is measured on an imaginary line perpendicular to the tread contact surface.

For example, in the configuration of FIG. 3, the thickness of the undertread 152 takes the maximum gauge UT_sh in a region around the edge portion on the shoulder main groove 21 side of the shoulder land portion 31 and takes a maximum gauge UT_ce at the central portion of the center land portion 32. The maximum gauge UT_sh of the undertread 152 in the ground contact region of the shoulder land portion 31 is set being smaller than the maximum gauge UT_ce of the undertread 152 in the center land portion 32.

Additionally, in the configuration of FIGS. 1 and 2, the groove configuration of the shoulder land portion 35 in the inner region in the vehicle width direction is different from the groove configuration of the shoulder land portion 31 in the outer region in the vehicle width direction in that the shoulder land portion 35 further includes a circumferential narrow groove 351. However, in the cross-sectional structure of the tread portion, the outer region and the inner region in the vehicle width direction are left-right symmetric except for the configuration of the grooves, notch portions, and sipes of the tread pattern (see FIG. 2). Additionally, as illustrated in FIG. 1, the maximum gauge of the undertread 152 in the left and right shoulder land portions 31, 35 is set being smaller than the maximum gauge of the undertread 152 in all of the center land portions 32 to 34. However, no such limitation is intended, and it is sufficient that the relationship between the maximum gauge UT_ce of the cap tread 151 and the maximum gauge UT_sh of the undertread 152 described above be satisfied for the set of the shoulder land portion 31; 35 and the center land portion 32; 34 located adjacent to each other with the shoulder main groove 21; 24 sandwiched therebetween.

In the configuration described above, (1) the undertread 152 of the center land portions 32, 34 has a low loss tangent tan δ_ut and a thick maximum gauge UT_ce, and thus heat build-up in the tread portion center region during rolling of the tire is suppressed, improving tire rolling resistance. Additionally, (2) the undertread 152 of the shoulder land portions 31, 35 has a thin maximum gauge UT_sh, thus relatively ensuring the gauge of the cap tread 151 corresponding to high breakdown resistance. This suppresses cracks and/or fractures in the shoulder land portions 31, 35 caused by the significant effect of repeated strain during rolling of the tire, improving the durability of the tire. This is advantageous in that both tire rolling resistance performance and durability performance are provided in a compatible manner.

Additionally, the maximum gauge UT_sh of the undertread 152 in the shoulder land portion 31 preferably has the relationship 0.08≤UT_sh/Ga_sh and more preferably has the relationship 0.10≤UT_sh/Ga_sh, with respect to the total gauge Ga_sh of the tread rubber 15 at the measurement point of the maximum gauge UT_sh. The upper limit of the ratio UT_sh/Ga_sh is not particularly limited, but is subject to restrictions by other conditions (particularly the relationship with the imaginary line Lw described below). Additionally, the maximum gauge UT_sh of the undertread 152 is preferably in the range 0.6 mm≤UT_sh≤4.6 mm.

Additionally, the maximum gauge UT_ce of the undertread 152 in the center land portions 32 to 34 preferably has the relationship 0.20≤UT_ce/Ga_ce and more preferably has the relationship 0.10≤UT_ce/Ga_ce, with respect to the total gauge Ga_ce of the tread rubber 15 at the measurement point of the maximum gauge UT_ce. The lower limit of the ratio UT_ce/Ga_ce is not particularly limited, but is subject to restrictions by the other conditions (particularly the relationship with the imaginary line Lw described below). Additionally, the maximum gauge UT_ce of the undertread 152 is preferably in the range 1.5 mm≤UT_ce≤5.5 mm.

Additionally, as illustrated in FIGS. 1 and 2, in the configuration including the plurality of center land portions 32 to 34, the ratio of the maximum value to the minimum value of the maximum gauge UT_ce of the undertread 152 in all of the center land portions 32 to 34 is preferably in the range of 1.00 or more and 1.20 or less, and is preferably in the range of 1.00 or more and 1.10 or less. Accordingly, the gauge of the undertread 152 is set being uniform among the plurality of center land portions 32 to 34.

Additionally, in the configuration of FIG. 2, the shoulder land portion 31 includes a plurality of shoulder lug grooves 311 and a plurality of sipes (reference sign is omitted in the drawings). Additionally, each of the shoulder lug grooves 311 has a so-called semi-closed structure, and at one end portion opens to the tire ground contact edge T and at the other end terminates within the shoulder land portion 35. Additionally, the groove width (dimension symbol omitted in drawings) of the shoulder lug groove 311 is in the range of 1.5 mm or more and 4.5 mm or less, and a groove depth H11 (see FIG. 4) is in the range 0.55≤H11/Hg1≤0.80 with respect to the groove depth Hg1 of the shoulder main groove 21. In addition, the sipe at one end portion opens to the shoulder main groove 21 and at the other end portion terminates within the shoulder land portion 35. Additionally, the sipe has a sipe width of 1.8 mm or less and a sipe depth of 3.0 mm or more and 7.0 mm or less (dimension symbol omitted in drawings). "Sipe" refers to a cut formed in a tread contact surface and is distinguished from lug grooves in that due to the above-described sipe width and sipe depth, the sipe closes when the tire comes into contact with the ground.

At this time, as illustrated in FIG. 4, a distance D2 from the edge portion of the shoulder main groove 21 side of the shoulder land portion 35 to the maximum gauge position of the undertread 152 in the shoulder land portion 35 preferably has the relationship 0.30≤D2/D1≤0.70 and more preferably has the relationship 0.40≤D2/D1≤0.60, with respect to the distance D1 from the edge portion on the shoulder main groove 21 side of the shoulder land portion 35 to the terminating end portion of the shoulder lug groove 311. The gauge of the undertread 152 gradually decreases from the maximum gauge position toward the tire ground contact edge T.

In a configuration in which the edge portion of the land portion includes a chamfered portion, an intersection point between the extension line of the road contact surface of the land portion and the extension line of the groove wall surface of the main groove is used as a measurement point for measurement of the distance from the edge portion of the land portion.

Furthermore, in FIG. 4, the distance D1 of the terminating end portion of the shoulder lug groove 311 preferably has the relationship 0.10≤D1/Wr_sh≤0.50 and more preferably has the relationship 0.15≤D1/Wr_sh≤0.30, with respect to the ground contact width Wr_sh of the shoulder land portion 35.

Additionally, in FIG. 4, a curved line Lw is defined that extends through a point at a distance of 1.6 mm from the maximum groove depth position of the shoulder main groove 21 and parallel to the tread profile. The curved line Lw corresponds to the position of the top surface of a wear indicator. At this time, all of the undertread 152 in the ground contact region of the shoulder land portion 31 is located further on the inner side than the curved line Lw in the tire radial direction. This prevents the undertread 152 from being exposed at the tread contact surface at the terminal stages of wear.

Additionally, in FIG. 4, the gauge of the cap tread at the maximum groove depth position of the shoulder lug groove 311 is preferably 0.7 mm or more.

Additionally, in FIG. 4, the gauge UT_e of the undertread 152 at the end portion of the wider cross belt 141 preferably has the relationship 0.05≤UT_e/Ga_sh≤0.30 with respect to the total gauge Ga_sh of the tread rubber at the measurement point of the gauge UT_e. Additionally, the gauge UT_e is preferably in the range 3.00 mm≤UT_e. In addition, the gauge UT_e is required to be less than the maximum gauge UT_sh of the undertread 152 in the shoulder land portion 31 (UT_e<UT_sh).

Additionally, in the configuration of FIG. 4, the turned back portion 132 of the carcass layer 13 overlaps the cross belts 141, 142 in the tire width direction. In addition, the end portion 1321 of the turned back portion 132 is located within the ground contact width Wr_sh of the shoulder land portion 31, and is located further on the outer side than the maximum gauge position of the undertread 152 in the tire width direction.

Additionally, in FIG. 5, gauges UT_a, UT_b, and UT_c of the undertread 152 are defined that correspond to positions of 25%, 50%, and 75% of the ground contact width Wr_ce of the center land portion 32 from one edge portion of the center land portion 32. In this case, the ratio between the maximum value and the minimum value of these gauges UT_a, UT_b, and UT_c is preferably in the range of 1.00 or more and 1.20 or less and more preferably in the range of 1.00 or more and 1.10 or less. Accordingly, the gauges of the undertread 152 in the central portion of the center land portion 32 are preferably uniform.

Additionally, the maximum gauge UT_ce of the undertread 152 in the center land portion 32 is preferably in the region of 25% or more and 75% or less of the ground contact width Wr_ce of the center land portion 32 from one edge portion of the center land portion 32. Thus, the maximum gauge position of the undertread 152 is in the central portion of the center land portion 32.

Additionally, in FIG. 5, the curved line Lw is defined that extends through a point at a distance of 1.6 mm from the maximum groove depth position of the shoulder main groove 21 and parallel to the tread profile, as is the case with FIG. 4 described above. In this case, the maximum gauge position of the undertread 152 in the center land portion 32 is located further on the inner side of the curved line Lw in the tire radial direction. This prevents the undertread 152 from being exposed at the tread contact surface at the terminal stages of wear.

Additionally, in FIG. 5, the gauge UT_g of the undertread 152 at the position of the maximum groove depth of the shoulder main groove 21 and the center main groove 22 preferably has the relationship 0.08≤UT_g/Ga_g≤0.60 with respect to the groove bottom gauge Ga_g of the tread rubber 15. Additionally, the gauge UT_g of the undertread 152 is preferably in the range of 0.2 mm or more and 1.0 mm or less.

The groove bottom gauge is measured when the tire is mounted on a specified rim, inflated to the specified internal pressure, and in an unloaded state. In this case, for example, the following measurement method is used. First, a tire unit is applied to the imaginary line of a tire profile measured by a laser profiler and fixed with tape or the like. Then, the gauge to be measured is measured with a caliper or the like. The laser profiler used here is a tire profile measuring device (available from Matsuo Co., Ltd.).

Additionally, in FIG. 5, the ratio UT_g/Ga_g of the gauge UT_g of the undertread 152 to the groove bottom gauge Ga_g of the tread rubber 15 at the maximum groove depth position of the shoulder main groove 21 preferably has the relationship 0.05≤(UT_g/Ga_g)/(UT_ce/Ga_ce)≤0.40 with respect to the ratio UT_ce/Ga_ce of the maximum gauge UT_ce (see FIG. 3) of the undertread 152 to the total gauge Ga_ce of the tread rubber 15 in the center land portion 32. In other words, the gauge ratio UT_g/Ga_g of the undertread 152 at the maximum groove depth position of the shoulder main grooves 21 is set being relatively small. This enables adjustment of the gauge (Ga_g−UT_g) of the cap tread 151 so as to increase breakdown resistance while ensuring the gauge of the undertread 152 corresponding to low heat build-up, at the groove bottom portions of the shoulder main grooves 21, 24. Additionally, the gauge (Ga_g−UT_g) of the cap tread 151 at the maximum groove depth position of the shoulder main groove 21 and the center main groove 22 is preferably 0.7 mm or more. A pneumatic tire including the undertread 152 with a relatively small gauge ratio UT_g/Ga_g at the maximum groove depth position as described above is manufactured as follows.

Figure 6:
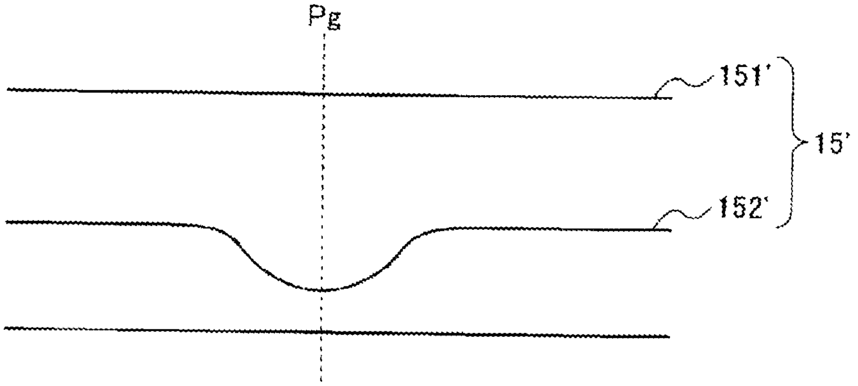
FIG. 6 is an explanatory diagram illustrating the method of manufacturing the pneumatic tire illustrated in FIG. 1.

FIG. 6 is an explanatory diagram illustrating a method of manufacturing the pneumatic tire illustrated in FIG. 1. The same drawing illustrates a cross-sectional view in the width direction of an unvulcanized tread rubber 15'.

As illustrated in FIG. 6, in a step for molding the green tire, two-color extrusion molding is performed using a rubber member 151' corresponding to the cap tread 151 and a rubber member 152' corresponding to the undertread 152, the rubber members 151' and 152' being layered, thus forming the unvulcanized tread rubber 15'. At this time, the tread rubber 15' is formed such that at the arrangement position Pg of the main grooves 21 to 24, the rubber member 152' of the undertread 152 has a small gauge, whereas the rubber member 151' of the cap tread 151 has a large gauge. Accordingly, in the tire after vulcanization molding, the gauge ratio UT_g/Ga_g of the undertread 152 at the maximum groove depth position of the shoulder main grooves 21 is set being relatively small.

Additionally, in the configuration of FIG. 2, the pair of center land portions 32, 34 defined by the left and right shoulder main grooves 21, 24 are provided with a plurality of chamfered sipes 321; 341, and short sipes (reference sign is omitted in the drawings). The chamfered sipes 321, 341 at one end portion open to the shoulder main grooves 21; 24, and at the other end portion terminates within the center land portions 32; 34. Additionally, none of the center land portions 32 to 34 include lug grooves that extend through the center land portions 32 to 34 in the tire width direction.

Figure 7:
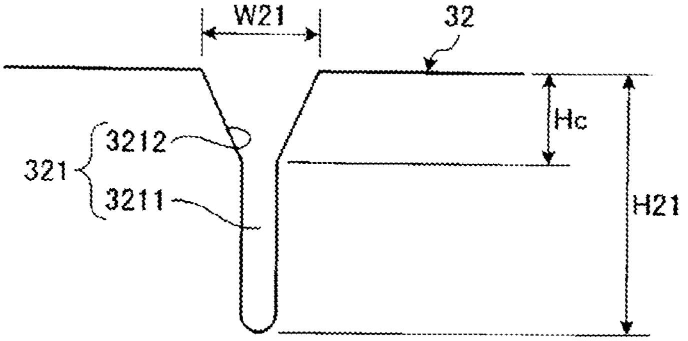
FIG. 7 is an explanatory diagram illustrating a chamfered sipe in the center land portion illustrated in FIG. 2.

FIG. 7 is an explanatory diagram illustrating a chamfered sipe of the center land portion illustrated in FIG. 2. The same drawing illustrates a cross-sectional view perpendicular to the extension direction of the chamfered sipe 321.

As illustrated in FIG. 7, the chamfered sipe 321 includes a sipe portion 3211 and a chamfered portion 3212, and has an opening width W21 of 1.0 mm or more and 3.0 mm or less and a depth H21 of 3.3 mm or more and 4.5 mm or less. Due to having a width of 0.3 mm or more and 1.5 mm or less (dimension symbol omitted in drawings), the sipe portion 3211 closes when the tire comes into contact with the ground. The chamfered portion 3212 has a depth He of 1.0 mm or more and 2.5 mm or less, and is formed at the connection portion between the wall surface of the sipe portion 3211 and the road contact surface of the land portion 32 and extends along the longitudinal direction of the chamfered sipe 321. The chamfered portion 3212 increases the opening width W21 of the chamfered sipe 321 to improve drainage properties.

The width of the chamfered sipe is measured as the maximum opening width of in the tread contact surface, with the tire mounted on a specified rim, inflated to a specified internal pressure, and in an unloaded state.

The depth of the chamfered sipe is measured as the distance from the tread contact surface to the sipe bottom, with the tire mounted on a specified rim, inflated to a specified internal pressure, and in an unloaded state.

As described above, in the configuration of FIG. 2, the center land portions 32 to 34 include no lug grooves but include only the chamfered sipes 321, 341, and normal sipes (reference sign is omitted in the drawings). Such a configuration is preferable in that the rigidity of the center land portion 32 to 34 is ensured, improving steering stability performance of the tire.

However, no such limitation is intended, and the center land portions 32, 34 may include lug grooves instead of the chamfered sipes 321, 341 (not illustrated). In this case, the lug grooves preferably have a groove depth of less than 2.5 mm. Additionally, the lug grooves preferably do not penetrate the center land portions 32, 34 as is the case with the chamfered sipes 321 and 341 described above. The rigidity of the center land portion 32 to 34 is ensured.

Effect

As described above, the pneumatic tire 1 includes a carcass layer 13, a pair of cross belts 141, 142 disposed on the outer side of the carcass layer 13 in the radial direction, a tread rubber 15 that includes a cap tread 151 and an undertread 152 that are layered and that is disposed on the outer side of the cross belts 141, 142 in the radial direction, a pair of shoulder main grooves 21, 24 and at least one center main groove 22, 23 that are formed in the tread surface, and a pair of shoulder land portions 31, 35 and two or more center land portions 32, 34 that are defined by the shoulder main grooves 21, 24 and the center main grooves 22, 23 (see FIGS. 1 and 2). Additionally, the loss tangent $\tan \delta_{cap}$ of the cap tread 151 at 60° C. has the relationship $\tan \delta_{ut} < \tan \delta_{cap}$ with respect to the loss tangent $\tan \delta_{ut}$ of the undertread 152 at 60° C. In addition, the maximum gauge $UT_{ce}$ of the undertread 152 in the center land portions 32, 34 has the relationship $1.20 \le UT_{ce}/UT_{sh} \le 2.50$ with respect to the maximum gauge $UT_{sh}$ of the undertread 152 in the ground contact regions of the shoulder land portions 31, 35 (see FIG. 3).

In such a configuration, (1) the undertread 152 of the center land portions 32, 34 has a low loss tangent $\tan \delta_{ut}$ and a thick maximum gauge $UT_{ce}$, and thus heat build-up in the tread portion center region during rolling of the tire is suppressed, improving tire rolling resistance. Additionally, (2) the undertread 152 of the shoulder land portions 31, 35 has a thin maximum gauge $UT_{sh}$, thus relatively ensuring the gauge of the cap tread 151 corresponding to high breakdown resistance. This suppresses cracks and/or fractures in the shoulder land portions 31, 35 caused by the significant effect of repeated strain during rolling of the tire, improving the durability of the tire. This is advantageous in that both tire rolling resistance performance and durability performance are provided in a compatible manner.

Additionally, in the pneumatic tire 1, the maximum gauge $UT_{sh}$ of the undertread 152 in the shoulder land portions 31, 35 has the relationship $0.08 \le UT_{sh}/Ga_{sh}$ with respect to the total gauge $Ga_{sh}$ of the tread rubber 15 at the measurement point of the maximum gauge $UT_{sh}$ (see FIG. 3). This is advantageous in that the maximum gauge $UT_{ce}$ of the undertread 152 is made proper.

Additionally, in the pneumatic tire 1, the maximum gauge $UT_{ce}$ of the undertread 152 in the center land portions 32, 34 has the relationship $0.20 \le UT_{ce}/Ga_{ce}$ with respect to the total gauge $Ga_{ce}$ of the tread rubber 15 at the measurement point of the maximum gauge $UT_{ce}$ (see FIG. 3). This is advantageous in that the gauge of the undertread 152 in the center land portions 32, 34 is ensured, ensuring the effect of improving the rolling resistance of the tire which is produced by the undertread 152.

Additionally, in the pneumatic tire 1, the maximum gauge $UT_{ce}$ of the undertread 152 in the center land portions 32, 34 is in the range 1.5 mm$\le UT_{ce} \le$5.5 mm. This is advantageous in that the maximum gauge $UT_{ce}$ of the undertread 152 is made proper.

Additionally, in the pneumatic tire 1, the ratio between the maximum value and the minimum value of the maximum gauge $UT_{ce}$ of the undertread 152 in the plurality of center land portions 32, 34 is in the range of 1.00 or more and 1.20 or less. In such a configuration, the gauge of the undertread 152 is set being uniform between the plurality of center land portions 32, 34, and this is advantageous in that the difference in rigidity between the center land portions 32, 34 can be reduced.

Additionally, in the pneumatic tire 1, the shoulder land portions 31; 35 include shoulder lug grooves 311; 352 at one end portion opening to the tire ground contact edge T and at the other end portion terminating within the shoulder land portions 31; 35 (see FIG. 2). In addition, the distance D2 from an edge portion on the shoulder main groove 21; 24 side of the shoulder land portion 31; 35 to the measurement point of the maximum gauge $UT_{sh}$ of the undertread 152 in the shoulder land portion 31; 35 has the relationship $0.30 \le D2/D1 \le 0.70$ with respect to the distance D1 from an edge portion of the shoulder main groove 21; 24 side of the shoulder land portion 31; 35 to the terminating end portion of the shoulder lug groove 311; 352 (see FIG. 4). This is advantageous in that the above-described lower limit properly ensures the gauge of the undertread 152 in the shoulder land portions 31, 35 and in that the above-described upper limit ensures the gauge of the cap tread 151 at the groove bottoms of the shoulder lug grooves 311, 352.

Additionally, in the pneumatic tire 1, the distance D1 of the terminating end portion of the shoulder lug groove 311; 352 has the relationship $0.10 \le D1/Wr_{sh} \le 0.50$ with respect to the ground contact width $Wr_{sh}$ of the shoulder land portion 31; 35 (see FIG. 4). This is advantageous in that the extension length of the shoulder lug groove 311; 352 is properly set and in that the wet performance and the dry performance of the tire are ensured.

Additionally, in the pneumatic tire 1, the gauge UT_e of the undertread 152 at the end portion of the wider cross belt 141 has the relationship 0.05≤UT_e/Ga_sh≤0.30 with respect to the total gauge Ga_sh of the tread rubber 15 at the measurement point of the gauge UT_e. This is advantageous in that the gauge UT_e of the undertread 152 at the end portion of the cross belt 141 is properly set.

Additionally, in the pneumatic tire 1, the gauge of the cap tread 151 at the maximum groove depth position of the shoulder lug groove 311, 352 is 0.7 mm or more (not illustrated). This is advantageous in that the gauge of the cap tread 151 at the maximum groove depth position is ensured.

Additionally, in the pneumatic tire 1, gauges UT_a, UT_b, and UT_c of the undertread 152 are defined that correspond to positions of 25%, 50%, and 75% of the ground contact width of the center land portion 32; 33; 34 from one edge portion of the center land portion 32; 33; 34, and the ratio between the maximum value and the minimum value of the gauges UT_a, UT_b, and UT_c of the undertread 152 is in the range of 1.00 or more and 1.20 or less (see FIG. 5). This is advantageous in that the gauges of the undertread 152 in the central portions of the center land portions 32; 33; 34 are made uniform, ensuring the volume of the undertread 152.

Additionally, in the pneumatic tire 1, a curved line Lw is defined that extends through a point at a distance of 1.6 mm from the maximum groove depth position of the shoulder main groove 21, 24 and parallel to the tread profile, and all of the undertread 152 in the center land portions 32 to 34 is located further on the inner side than the curved line Lw in the tire radial direction (see FIG. 5). This is advantageous in that the undertread 152 is prevented from being exposed at the tread contact surface at the terminal stages of wear.

Additionally, in the pneumatic tire 1, the gauge UT_g of the undertread 152 at the maximum groove depth position of the shoulder main groove 21 has the relationship such that 0.08≤UT_g/Ga_g≤0.60 with respect to the groove bottom gauge Ga_g of the tread rubber 15 at the maximum groove depth position (see FIG. 5). This is advantageous in that the above-described lower limit ensures the gauge UT_g of the undertread 152 in the groove bottom portion of the shoulder main groove 21. The above-described upper limit is advantageous in that the gauge of the cap tread 151 at the groove bottom portion of the shoulder main groove 21 is ensured, suppressing possible cracks in the groove bottom portion caused by repeated strain.

Additionally, in the pneumatic tire 1, the ratio UT_g/Ga_g (see FIG. 3) of the gauge UT_g of the undertread 152 to the groove bottom gauge Ga_g of the tread rubber 15 at the maximum groove depth position of the shoulder main groove 21, 24 has the relationship 0.05≤(UT_g/Ga_g)/(UT_ce/Ga_ce)≤0.40 with respect to the ratio UT_ce/Ga_ce (see FIG. 5) of the maximum gauge UT_ce of the undertread 152 to the total gauge Ga_ce of the tread rubber 15 in the center land portion 32, 34. This is advantageous in that at the groove bottom portions of the shoulder main grooves 21, 24, the gauge of the cap tread 151 may be adjusted so as to increase breakdown resistance, with the gauge of the undertread 152 that corresponds to low heat build-up being ensured.

Additionally, in the pneumatic tire 1, the loss tangent tan δ_cap of the cap tread 151 is in the range 0.10≤tan δ_cap. This is advantageous in that the physical properties of the cap tread 151 are made proper.

Additionally, in the pneumatic tire 1, the rubber hardness Hs_cap of the cap tread 151 has the relationship Hs_ut<Hs_cap with respect to the rubber hardness Hs_ut of the undertread 152. This is advantageous in that the physical properties of the cap tread 151 are made proper.

EXAMPLES

FIG. 8 is a table showing results of performance tests of pneumatic tires according to the embodiment of the technology.

In the performance tests, (1) rolling resistance performance and (2) durability performance were evaluated for a plurality of types of test tires. Furthermore, the test tires having a tire size of 195/65R15 91H were assembled on rims having a rim size of 15×6J, and an internal pressure and a load specified by JATMA were applied to the test tires.

(1) In the evaluation of rolling resistance performance, a drum testing machine with a rim diameter of 1707 mm was used, and the rolling resistance coefficients of the test tires were calculated at a load of 4.8 kN, an air pressure of 230 kPa, and a speed of 80 km/h in accordance with ISO (The International Organization for Standardization) 28580. Results of the evaluations are expressed as index values and evaluated, with result of Conventional Example 1 being defined as the reference (100). Higher values are preferable.

(2) In the evaluation for durability performance, the test vehicle was driven 500 times on a figure-of-eight test course, and the tire weight was then measured to calculate the amount of block chipping. Results of the evaluations are expressed as index values and evaluated, with the result of Conventional Example 1 being defined as the reference (100). Higher values are preferable. Moreover, an evaluation of 98 or higher indicates that tire durability performance is properly ensured.

The test tires of the Examples have the configuration illustrated in FIGS. 1 to 3, and the gauges of the undertread 152 in the center land portions 32 to 34 are all set being greater than the gauge of the undertread in the ground contact region of the shoulder land portion. In addition, the loss tangent tan δ_cap of the cap tread 151 at 60° C. is 0.15, and the loss tangent tan δ_ut of the undertread 152 at 60° C. is 0.08. Additionally, the maximum gauge Ga_sh of the tread rubber 15 in the shoulder land portions 31, 35 is 8.0 mm, and the maximum gauge Ga_ce of the tread rubber 15 in the center land portions 32, 34 is 8.0 mm. Additionally, the groove depth of the circumferential main grooves 21 to 24 is 7.5 mm. The distance D1 of the terminating end portion of the shoulder lug groove 311, 352 has the relationship such that D1/Wr_sh=0.20 with respect to the ground contact width Wr_sh of the shoulder land portion.

In the configuration of FIGS. 1 to 3, the test tires of Conventional Examples 1 and 2 have the same maximum gauges UT_ce and UT_sh of the undertread 152 in all of the land portions 31 to 35.

The test results indicate that the test tires of Examples can improve rolling resistance performance while maintaining the durability performance of the tire.

The invention claimed is:

1. A pneumatic tire, comprising:

a carcass layer;

a pair of cross belts disposed on an outer side of the carcass layer in a radial direction;

a tread rubber comprising a cap tread and an undertread that are layered, the tread rubber being disposed on the outer side of the cross belts in the radial direction;

a pair of shoulder main grooves and at least one center main groove that are formed in the tread surface; and
a pair of shoulder land portions and two or more center land portions that are defined by the shoulder main grooves and the center main grooves,
a loss tangent tan δ_cap of the cap tread at 60° C. having a relationship tan δ_ut<tan δ_cap with respect to a loss tangent tan δ_ut of the undertread at 60° C.,
a maximum gauge UT_ce of the undertread in the center land portions having a relationship 1.20≤UT_ce/UT_sh≤2.50 with respect to a maximum gauge UT_sh of the undertread in a ground contact region of the shoulder land portion, and
the maximum guage UT_ce of the undertread in the center land portions is in a range 1.5 mm≤UT_ce≤55 mm.

2. The pneumatic tire according to claim 1, wherein
the maximum gauge UT_sh of the undertread in the shoulder land portions has a relationship 0.08≤UT_sh/Ga_sh with respect to a total gauge Ga_sh of the tread rubber at a measurement point of the maximum gauge UT_sh.

3. The pneumatic tire according to claim 1, wherein
the maximum gauge UT_ce of the undertread in the center land portions has a relationship 0.20≤UT_ce/Ga_ce with respect to a total gauge Ga_ce of the tread rubber at a measurement point of the maximum gauge UT_ce.

4. The pneumatic tire according to claim 1, wherein
a ratio of a maximum value and a minimum value of the maximum gauge UT_ce of the undertread in the center land portions is in a range of 1.00 or more and 1.20 or less.

5. The pneumatic tire according to claim 1, wherein
the shoulder land portion comprises a shoulder lug groove that at one end portion opens to a tire ground contact edge and that at an other end portion terminates within the shoulder land portion, and
a distance D2 from an edge portion on the shoulder main groove side of the shoulder land portion to a maximum gauge position of the undertread in the shoulder land portion has a relationship 0.30≤D2/D1≤0.70 with respect to a distance D1 from an edge portion on the shoulder main groove side of the shoulder land portion to a terminating end portion of the shoulder lug groove.

6. The pneumatic tire according to claim 5, wherein
the distance D1 of the terminating end portion of the shoulder lug groove has a relationship 0.15≤D1/Wr_sh≤0.50 with respect to a ground contact width Wr_sh of the shoulder land portions.

7. The pneumatic tire according to claim 1, wherein
a gauge UT_e of the undertread at an end portion of a wider cross belt of the pair pf cross belts having a large width has a relationship 0.05≤UT_e/Ga_sh≤0.30 with respect to a total gauge Ga_sh of the tread rubber at a measurement point of the gauge UT_e.

8. The pneumatic tire according to claim 7, wherein
a guage of the cap tread at a maximum groove depth position of a shoulder lug groove is 0.7 mm or more, one end portion of the shoulder lug groove opening at a tire ground contact edge and an other end portion of the shoulder lug groove terminating within the shoulder land portion.

9. The pneumatic tire according to claim 1, wherein
gauges UT_a, UT_b, and UT_c of the undertread are defined that correspond to positions of 25%, 50%, and 75% of a ground contact width of the center land portions from one edge portion of the center land portions, and a ratio between a maximum value and a minimum value of the gauges UT_a, UT_b, and UT_c of the undertread is in a range of 1.00 or more and 1.20 or less.

10. The pneumatic tire according to claim 1, wherein
a curved line Lw is defined that extends through a point at a distance of 1.6 mm from a maximum groove depth position of the shoulder main grooves and is parallel to a tread profile, and all of the undertread in the center land portions is located further on an inner side than the curved line Lw in the tire radial direction.

11. The pneumatic tire according to claim 1, wherein
the gauge UT_g of the undertread at a maximum groove depth position of the shoulder main groove has a relationship 0.08≤UT_g/Ga_g≤0.60 with respect to a groove bottom gauge Ga_g of the tread rubber at the maximum groove depth position.

12. The pneumatic tire according to claim 1, wherein
a ratio UT_g/Ga_g of a gauge UT_g of the undertread to a groove bottom gauge Ga_g of the tread rubber at a maximum groove depth position of the shoulder main groove has a relationship 0.05≤(UT_g/Ga_g)/(UT_ce/Ga_ce)≤0.40 with respect to a ratio UT_ce/Ga_ce of the maximum gauge UT_ce of the undertread in the center land portions to a total gauge Ga_ce of the tread rubber.

13. The pneumatic tire according to claim 1, wherein
a loss tangent tan δ_cap of the cap tread is in a range 0.10≤tan δ_cap.

14. The pneumatic tire according to claim 1, wherein
a rubber hardness Hs_cap of the cap tread has a relationship Hs_ut<Hs_cap with respect to a rubber hardness Hs_ut of the undertread.

15. A pneumatic tire, comprising:
a carcass layer;
a pair of cross belts disposed on an outer side of the carcass layer in a radial direction;
a tread rubber comprising a cap tread and an undertread that are layered, the tread rubber being disposed on the outer side of the cross belts in the radial direction;
a pair of shoulder main grooves and at least one center main groove that are formed in a tread surface; and
a pair of shoulder land portions and two or more center land portions that are defined by the shoulder main grooves and the at least one center main groove,
a loss tangent tanδ_cap of the cap tread at 60° C. having a relationship tanδ_ut<tanδ_cap with respect to a loss tangent tanδ_ut of the undertread at 60° C.,
a maximum gauge UT_ce of the undertread in the center land portions having a relationship 1.20≤UT_ce/UT_sh≤2.50 with respect to a maximum gauge UT_sh of the undertread in a ground contact region of the shoulder land portions, and
a ratio of a maximum value and a minimum value of the maximum gauge UT_ce of the undertread in the center land portions being in a range of 1.00 or more and 1.20 or less.

16. A pneumatic tire, comprising:
a carcass layer;
a pair of cross belts disposed on an outer side of the carcass layer in a radial direction;
a tread rubber comprising a cap tread and an undertread that are layered, the tread rubber being disposed on the outer side of the cross belts in the radial direction;
a pair of shoulder main grooves and at least one center main groove that are formed in a tread surface; and a pair of shoulder land portions and two or more center land portions that are defined by the shoulder main grooves and the at least one center main groove, a loss tangent tanδ_cap of the cap tread at 60° C. having a relationship tanδ_ut<tanδ_cap with respect to a loss tangent tanδ_ut of the undertread at 60° C., a maximum gauge UT_ce of the undertread in the center land portions having a relationship 1.20≤UT_ce/UT_sh≤2.50 with respect to a maximum gauge UT_sh of the undertread in a ground contact region of the shoulder land portions, and a curved line Lw is defined that extends through a point at a distance of 1.6 mm from a maximum groove depth position of the shoulder main groove and is parallel to a tread profile, and all of the undertread in the center land portions is located further on an inner side than the curved line Lw in the tire radial direction.

* * * * *